(12) United States Patent
Higashino et al.

(10) Patent No.: US 6,803,402 B2
(45) Date of Patent: Oct. 12, 2004

(54) ELASTOMER MOLDED ARTICLE AND CROSSLINKABLE FLUORINE-CONTAINING ELASTOMER COMPOSITION FOR SEMICONDUCTOR PRODUCTION APPARATUSES

(75) Inventors: Katsuhiko Higashino, Settsu (JP); Masanori Hasegawa, Settsu (JP); Hiroyuki Tanaka, Settsu (JP); Tsuyoshi Noguchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 359 days.

(21) Appl. No.: 09/959,516

(22) PCT Filed: Oct. 31, 2000

(86) PCT No.: PCT/JP00/07671

§ 371 (c)(1),
(2), (4) Date: Oct. 29, 2001

(87) PCT Pub. No.: WO01/32782

PCT Pub. Date: May 10, 2001

(65) Prior Publication Data

US 2003/0045623 A1 Mar. 6, 2003

(30) Foreign Application Priority Data

Nov. 4, 1999 (JP) .......................................... 11/314273

(51) Int. Cl.⁷ ............................................... C08K 3/18
(52) U.S. Cl. ....................................................... 524/430
(58) Field of Search ............................................ 324/430

(56) References Cited

U.S. PATENT DOCUMENTS

| 5,358,775 A | 10/1994 | Horn, III .................... 428/209 |
| 5,530,060 A | 6/1996 | Fujiki et al. |

FOREIGN PATENT DOCUMENTS

| JP | 58-7441 | 1/1983 | |
| JP | 58-74739 | 5/1983 | ........... C08L/27/18 |
| JP | 2-155943 | 6/1990 | ........... C08L/27/12 |
| JP | 2-212541 | 8/1990 | ........... C08L/27/12 |
| JP | 6-244320 | 9/1994 | ........... H01L/23/29 |
| JP | 2000-154369 | 6/2000 | ........... C09K/3/10 |

OTHER PUBLICATIONS

Office Action from Taiwan Patent Office dated Sep. 1, 2003.
International Search Report for PCT/JP00/07671 dated Jan. 30, 2001.

Primary Examiner—Edward J. Cain
(74) Attorney, Agent, or Firm—Sughrue Mion, PLLC

(57) ABSTRACT

Elastomer molded article for semiconductor production apparatuses which is obtained by crosslinking and molding a crosslinkable fluorine-containing elastomer composition comprising a crosslinkable fluorine-containing elastomer component and fine particles of aluminum oxide having an average particle size of not more than 0.5 $\mu$m. The elastomer molded article is excellent in plasma resistance and an amount of micro particles generated after irradiation of plasma is very small and therefore a very clean molded article for semiconductor production apparatuses, particularly a sealing material to be used in an environment of plasma irradiation is provided.

8 Claims, No Drawings

ELASTOMER MOLDED ARTICLE AND CROSSLINKABLE FLUORINE-CONTAINING ELASTOMER COMPOSITION FOR SEMI-CONDUCTOR PRODUCTION APPARATUSES

TECHNICAL FIELD

The present invention relates to a clean crosslinkable fluorine-containing elastomer composition containing fine particles of aluminum oxide which can give an elastomer molded article to be used for semi-conductor production apparatuses, for example, a sealing material for sealing thereof, and relates to a molded article which is obtained from the elastomer composition, is excellent in plasma resistance and has the reduced number of micro particles.

BACKGROUND ART

In producing semiconductor elements, very high cleanliness is required, and the requirements for high cleanliness range over not only management of a production process of semiconductors but also semiconductor production apparatuses and parts thereof. If the parts of semiconductor production apparatuses are cleaned after built in the apparatuses, a degree of possible cleanliness is limited. Such parts are required to have been cleaned highly before built in the apparatuses. In production of semiconductors, there are various contaminants which come from parts of semi-conductor production apparatuses, for example, so-called micro particles which are fine particles generated and released from the parts and impurity gas (outgas) to be mixed into atmosphere gas due to decomposition and deterioration of materials of the parts. Those contaminants have an adverse effect particularly on accurate etching treatment of semiconductor elements.

Also cleanliness is required similarly in a molded article such as a sealing material for semiconductor production apparatuses which the present invention can be particularly suitably applied to. The present applicant has attained high cleanliness of the sealing material itself by employing a special method of cleaning the sealing material after molding (WO99/49997).

The sealing material which is required to have heat resistance and chemical resistance has been produced by crosslinking and molding a crosslinkable fluorine-containing elastomer composition such as a fluorine-containing rubber, and in order to improve mechanical properties such as compression set, there is a case where a metal oxide filler is added to the composition. It is known that as such a filler, titanium oxide, silicon oxide (white carbon), aluminum oxide (alumina), or the like is added (Japanese Patent Publication No. 2783576, U.S. Pat. No. 5,187,222, JP-A-1-118560, JP-A-56-166251, U.S. Pat. No. 4,525,539). In some cases, those fillers are added to enhance whiteness and improve plasma resistance (Japanese Patent Publication No. 2858198, JP-A-2000-502122, U.S. Pat. No. 5,696,189).

Also in order to clean the inside of semi-conductor production process, there is a case where a process for cleaning is carried out with fluorine plasma, particularly $NF_3$ plasma. With advance of high integration of semi-conductors, since cleanliness inside the process needs to be maintained highly, cleaning process is repeated many times. In that cleaning process, there is a problem with gasification of the above-mentioned titanium oxide and silicon oxide, namely there is a case where outgas is generated from molded parts made of an elastomer containing such oxides. Also in some cases, micro particles (impurity fine particles) are generated from the molded parts made of an elastomer. Those contamination sources must be eliminated.

Also in a plasma etching process, for etching of a pattern having a high aspect ratio as a result of fabrication of fine structure, and further for enhancing an etching rate, an etching process with a high density plasma has come to be adopted. An etching process with a high density plasma means a plasma process with various gases, for example, under plasma conditions that a plasma density with argon gas is not less than $1.00\times10^{11}/cm^3$ at a pressure of 10 mTorr at an output of 800 W. In such a high density plasma, a fluorine-containing elastomer molded article containing the above-mentioned titanium oxide or silicon oxide is deteriorated remarkably in a plasma process not only with a fluorine plasma such as $NF_3$ but also with oxygen plasma or the like.

An object of the present invention is to provide a fluorine-containing elastomer molded article containing fine particles of aluminum oxide, being excellent in plasma resistance, especially fluorine plasma resistance and being capable of reducing particle generation after irradiation of plasma, and a crosslinkable fluorine-containing elastomer composition to be used therefor.

Further an object of the present invention is to provide a fluorine-containing elastomer molded article containing fine particles of aluminum oxide, being excellent particularly in resistance to high density plasma, and being capable of reducing generation of micro particles after irradiation of plasma, and a crosslinkable fluorine-containing elastomer composition to be used therefor.

DISCLOSURE OF INVENTION

Namely the present invention relates to the fluorine-containing elastomer molded article for semi-conductor production apparatuses which is obtained by crosslinking and molding a crosslinkable fluorine-containing elastomer composition comprising a crosslinkable fluorine-containing elastomer component and fine particles of aluminum oxide, wherein an average particle size of the fine particles of aluminum oxide is not more than 0.5 $\mu$m, preferably 0.005 to 0.05 $\mu$m.

The molded article is suitable as a sealing material to be used for sealing of semi-conductor production apparatuses, particularly for sealing of semi-conductor production apparatuses in which irradiation of high density plasma is carried out.

Also the present invention relates to the crosslinkable fluorine-containing elastomer composition which comprises a crosslinkable fluorine-containing elastomer component and fine particles of aluminum oxide having an average particle size of not more than 0.5 $\mu$m and is used for producing the elastomer molded article for semi-conductor production apparatuses.

It is preferable that the crosslinkable fluorine-containing elastomer composition comprises 0.05 to 10 parts by weight (hereinafter referred to as "part") of an organic peroxide, 0.1 to 10 parts of a crosslinking aid and 1 to 150 parts of the above-mentioned fine particles of aluminum oxide based on 100 parts of the crosslinkable fluorine-containing elastomer, for example, a perfluoro elastomer component.

The present invention also relates to the semi-conductor production apparatuses provided with the above-mentioned elastomer molded article for semi-conductor production apparatuses.

BEST MODE FOR CARRYING OUT THE INVENTION

An average particle size of the fine particles of aluminum oxide to be used in the present invention is not more than 0.5

μm, preferably 0.005 to 0.1 μm. Hitherto it has been considered that as the particle size becomes smaller, handling property of not only the fine particles but also the crosslinkable elastomer composition becomes poor. However in the present invention, unexpectedly handling property (kneading property, etc.) of the crosslinkable elastomer composition is not lowered.

Particularly when the fine particles having an average particle size of from about 0.005 μm to about 0.05 μm are used, even in case where a pattern of 0.2 μm distance between the patterning lines (line width) is drawn on semiconductor element, no connection of lines occurs (no plugging occurs between the lines).

As a crystal form of the aluminum oxide, there are many crystal forms such as α-form, β-form, γ-form and θ-form. In the present invention, though the crystal form of the aluminum oxide is not limited particularly, preferred is θ-form aluminum oxide from the viewpoint of excellent handling property in preparation (kneading) and processing steps of the crosslinkable elastomer composition.

In case of use for parts of semi-conductor production apparatuses where a very clean molded article is required, it is preferable to adjust a content of impurity metals other than aluminum in the fine particles of aluminum oxide to not more than 70 ppm, preferably not more than 50 ppm, more preferably not more than 10 ppm (analyzing method by ashing).

Then explained below is the crosslinkable fluorine-containing elastomer composition for producing the elastomer molded article for semi-conductor production apparatuses of the present invention.

The crosslinkable fluorine-containing elastomer composition basically comprises the crosslinkable fluorine-containing elastomer component and the above-mentioned fine particles of aluminum oxide.

Examples of the crosslinkable fluorine-containing elastomer component are, for instance, as follows.

(1) Perfluoro elastomer comprising recurring units derived from 40 to 90% by mole of tetrafluoroethylene, 10 to 60% by mole of perfluoro(vinyl ether) represented by the formula (1):

$$CF_2=CF-OR_f$$

wherein $R_f$ is a perfluoroalkyl group having 1 to 5 carbon atoms or a perfluoroalkyl(poly)ether group having 3 to 12 carbon atoms and 1 to 3 oxygen atoms, and 0 to 5% by mole of a monomer giving a curing moiety, respectively.

(2) Vinylidene fluoride elastomer comprising recurring units derived from 30 to 90% by mole of vinylidene fluoride, 15 to 40% by mole of hexafluoropropylene and 0 to 30% by mole of tetrafluoroethylene, respectively.

(3) Thermoplastic perfluoro elastomer which is a fluorine-containing multi-segment polymer comprising an elastomeric fluorine-containing polymer chain segment and a non-elastomeric fluorine-containing polymer chain segment, in which the elastomeric fluorine-containing polymer chain segment comprises recurring units derived from 40 to 90% by mole of tetrafluoroethylene, 10 to 60% by mole of perfluoro(vinyl ether) represented by the formula (1):

$$CF_2=CF-OR_f$$

wherein $R_f^1$ is a perfluoroalkyl group having 1 to 5 carbon atoms or a perfluoroalkyl(poly)ether group having 3 to 12 carbon atoms and 1 to 3 oxygen atoms, and 0 to 5% by mole of a monomer giving a curing moiety, respectively, and the non-elastomeric fluorine-containing polymer chain segment comprises recurring units derived from 85 to 100% by mole of tetrafluoroethylene and 0 to 15% by mole of a compound represented by the formula (2):

$$CF_2=CF-R_f^1$$

wherein $R_f^1$ is $CF_3$ or $OR_f^2$, in which $R_f^2$ is a perfluoroalkyl group having 1 to 5 carbon atoms, respectively.

(4) Thermoplastic non-perfluoro elastomer which is a fluorine-containing multi-segment polymer comprising an elastomeric fluorine-containing polymer chain segment and a non-elastomeric fluorine-containing polymer chain segment, in which the elastomeric fluorine-containing polymer chain segment comprises recurring units derived from 45 to 85% by mole of vinylidene fluoride and at least one other monomer copolymerizable with vinylidene fluoride, respectively. Examples of the other monomer are hexafluoropropylene, tetrafluoroethylene, chlorotrifluoroethylene, trifluoroethylene, trifluoropropylene, tetrafluoropropylene, pentafluoropropylene, trifluorobutene, tetrafluoroisobutene, perfluoro(alkyl vinyl ether), vinyl fluoride, ethylene, propylene, alkylvinylether, and the like.

(5) Cold resistant fluorine-containing elastomer prepared by radical polymerization in the presence of a di-iodine compound and comprising recurring units derived from 0.005 to 1.5% by mole of iodine-containing fluorinated vinyl ether, 40 to 90% by mole of vinylidene fluoride and 3 to 35% by mole of perfluoro(methyl vinyl ether) (as case demands, hexafluoropropylene up to 25% by mole and/or tetrafluoroethylene up to 40% by mole may be contained), respectively (JP-A-8-15753).

(6) Copolymer comprising recurring units derived from ethylene, tetrafluoroethylene and perfluoro(alkyl vinyl ether), respectively.

(7) Copolymer comprising recurring units derived from tetrafluoroethylene and propylene respectively (U.S. Pat. No. 3,467,635), copolymer comprising recurring units derived from tetrafluoroethylene, propylene and vinylidene fluoride, respectively, and the like.

The crosslinkable fluorine-containing elastomer composition can be crosslinked and molded into desired forms of products for semi-conductor production apparatuses. As a crosslinking method, though peroxide crosslinking is usual, there are other known crosslinking methods, for example, a method of triazine crosslinking by forming a triazine ring with an organotin compound by using a fluorine-containing elastomer having a nitrile group introduced as a crosslinking point (for example, JP-A-58-152041), a method of oxazole crosslinking by forming an oxazole ring with bisaminophenol similarly by using a fluorine-containing elastomer having a nitrile group introduced as a crosslinking point (for example, JP-A-59-109546), a method of imidazole crosslinking by forming an imidazole ring with a tetraamine compound (for example, JP-A-59-109546), a method of thiazole crosslinking by forming a thiazole ring with bisaminothiophenol (for example, JP-A-8-104789), and the like. Also methods of polyol crosslinking with a polyol compound and crosslinking by irradiating radioactive rays, electron beams, or the like may be used.

Examples of a crosslinking agent used for oxazole crosslinking system, imidazole crosslinking system and thiazole crosslinking system are, for instance, a bisaminothiophenol crosslinking agent, bisaminophenol crosslinking agent and bisdiaminophenyl crosslinking agent represented by the formula (3):

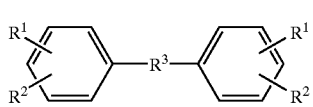
(3)

wherein $R^3$ is —$SO_2$—, —O—, —CO—, an alkylene group which has 1 to 6 carbon atoms and may be substituted, a perfluoroalkylene group having 1 to 10 carbon atoms,

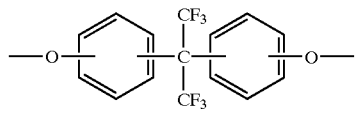

or a single bond, one of $R^1$ and $R^2$ is —$NH_2$ and another one is —$NH_2$, —OH or —SH, preferably both of $R^1$ and $R^2$ are —$NH_2$, a bisamidorazone crosslinking agent represented by the formula (4):

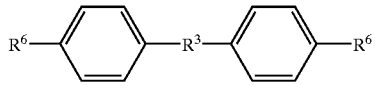
(4)

in which $R^3$ is as defined above, $R^6$ is

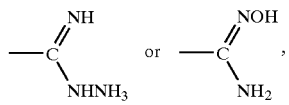

and a bisamidoxime crosslinking agent represented by the formula (5) or (6),

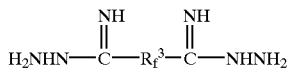
(5)

in which $R_f^3$ is a perfluoroalkylene group having 1 to 10 carbon atoms,

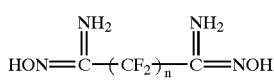
(6)

in which n is an integer of 1 to 10. Those bisaminophenol crosslinking agent, bisaminothiophenol crosslinking agent and bisdiaminophenyl crosslinking agent have been used for a crosslinking system wherein a nitrile group is used as a crosslinking point. Further since they also react with carboxyl group and alkoxycarbonyl group, an oxazole ring, thiazole ring and imidazole ring are also formed in crosslinking systems having those functional groups as the crosslinking points and thus a crosslinked product can be given.

Examples of the particularly preferred crosslinking agent are compounds having a plurality of 3-amino-4-hydroxyphenyl groups, 3-amino-4-mercaptophenyl groups or 3,4-diaminophenyl groups represented by the formula (7):

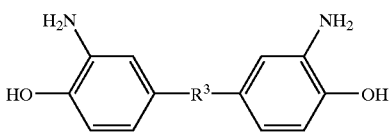
(7)

in which $R^3$ is as defined above. Concrete examples thereof are, for instance, 2,2-bis(3-amino-4-hydroxyphenyl) hexafluoropropane (general term: bis(aminophenol)AF), 2,2-bis(3-amino-4-mercaptophenyl)hexafluoropropane, tetraaminobenzene, bis-3,4-diaminophenylmethane, bis-3,4-diaminophenylether, 2,2-bis(3,4-diaminophenyl) hexafluoropropane, and the like.

An adding amount of the crosslinking agent is preferably from 0.1 to 10 parts on the basis of 100 parts of the crosslinkable fluorine-containing elastomer.

When carrying out peroxide crosslinking, any of known organic peroxides which generate a peroxy radical under vulcanizing temperature condition may be used. Examples of the preferred organic peroxide are di-t-butyl peroxide, dicumyl peroxide, 2,5-dimethyl-2,5-di(benzoylperoxy) hexane, 2,5-dimethyl-2,5-di(t-butylperoxy)hexane, 1,1-bis (t-butylperoxy)-3,5,5-trimethylcyclohexane, 2,5-dimethylhexane-2,5-dihydroxy peroxide, t-butylcumyl peroxide, α,α'-bis(t-butylperoxy)-p-diisopropylbenzene, 2,5-dimethyl-2,5-di(t-butylperoxy)hexyne-3, benzoyl peroxide, t-butylperoxybenzene, t-butylperoxymaleate, t-butylperoxyisopropyl carbonate, and the like.

A content of the organic peroxide is usually from 0.05 to 10 parts, preferably from 1 to 5 parts on the basis of 100 parts of the crosslinkable fluorine-containing elastomer.

When the content of the organic peroxide is less than 0.05 part, the crosslinkable fluorine-containing elastomer is not crosslinked sufficiently, and when more than 10 parts, physical properties of the crosslinked product are lowered.

In such peroxide crosslinking, a crosslinking aid such as a polyfunctional co-crosslinking agent can be used. As the polyfunctional co-crosslinking agent, those which are used together with an organic peroxide in peroxide crosslinking of a crosslinkable fluorine-containing elastomer can be used. For example, there are bisolefins represented by triallylcyanurate, trimethallylisocyanurate, triallylisocyanurate, triallylformal, triallylphosphate, triallyltrimellitate, N,N'-m-phenylenebismaleimide, dipropargylterephthalate, diallylphthalate, tetraallylterephthalamide, tris(diallylamine)-s-triazine, triallylphosphite, N,N-diallylacrylamide and 1,6-divinyldodecafluorohexane.

Also suitable are fluorine-containing triallylisocyanurate prepared by replacing a part of hydrogen atoms in three allyl groups of triallylisocyanurate with fluorine atoms having higher heat resistance, and the like (cf. U.S. Pat. No. 4,320,216, WO98/00407, Klenovich, S. V. et al, Zh. Prikl, Khim. (Leningrad) (1987, 60(3), 656-8)).

A content of the crosslinking aid is usually from 0.1 to 10 parts, preferably 0.5 to 5 parts on the basis of 100 parts of the crosslinkable fluorine-containing elastomer.

In addition, a processing aid, internal mold releasing agent, and the like may be added. Peroxide crosslinking can be carried out by usual method.

The molded article of the present invention is cleaned significantly highly by treating, for example, through a special cleaning method disclosed in the above-mentioned WO99/49997, namely a method of washing with ultra-pure water, a method of washing with a clean organic compound in the form of liquid at a washing temperature or an inorganic aqueous solution, a method of cleaning by dry etching or a method of extraction cleaning, and thus the molded article for semiconductor production apparatuses which ensures less releasing of an outgas and is excellent in plasma resistance can be obtained.

The crosslinkable elastomer composition of the present invention can be used suitably for a molded article for semiconductor production apparatuses, particularly for production of a sealing material for sealing of semiconductor production apparatuses, in which high cleanliness is demanded, especially semiconductor production apparatuses, in which irradiation of high density plasma is carried out. Examples of the sealing material are O-ring, square ring, gasket, packing, oil seal, bearing seal, lip seal, and the like.

In addition, the crosslinkable elastomer composition can be used for a variety of elastomer products to be used on semi-conductor production apparatuses, for example, diaphragm, tube, hose, various rubber rolls, and the like. Also the composition can be used as a coating material and a lining material.

In the present invention, the semiconductor production apparatuses are not limited particularly to apparatuses for producing semiconductors and encompass whole manufacturing equipment used in the field of semiconductors where a high degree of cleanliness is required, such as equipment for manufacturing a liquid crystal panel and plasma panel.

Examples of the semiconductor production apparatuses are as follows.
(1) Etching system
  Dry etching equipment
    Plasma etching machine
    Reactive ion etching machine
    Reactive ion beam etching machine
    Sputter etching machine
    Ion beam etching machine
  Wet etching equipment
  Ashing equipment
(2) Cleaning system
  Dry etching cleaning equipment
    UV/$O_3$ cleaning machine
    Ion beam cleaning machine
    Laser beam cleaning machine
    Plasma cleaning machine
    Gas etching cleaning machine
  Extractive cleaning equipment
    Soxhlet extractive cleaning machine
    High temperature high pressure extractive cleaning machine
    Microwave extractive cleaning machine
    Supercritical extractive cleaning machine
(3) Exposing system
  Stepper
  Coater and developer
(4) Polishing system
  CMP equipment
(5) Film forming system
  CVD equipment
  Sputtering equipment
(6) Diffusion and ion implantation system
  Oxidation and diffusion equipment
  Ion implantation equipment The present invention is then explained by means of examples, but is not limited to them.

EXAMPLE 1

The elastomer composition of the present invention was prepared by kneading 10 g of fine particles of aluminum oxide (AKP-G008 available from Sumitomo Chemical Industries, Ltd., specific surface area: 80 $m^2/g$, average particle size 0.02 µm, crystal form: θ-form, hereinafter referred to as "Filler 1"), 1.0 g of PERHEXA 2.5B (available from NOF Corporation) and 3.0 g of triallylisocyanurate (TAIC) with 100 g of tetrafluoroethylene/perfluoro(methyl vinyl ether) copolymer elastomer.

A change in weight of the fine particles of aluminum oxide (Filler 1) by plasma irradiation was determined by the following method. The results are shown in Table 1. In Table 1, minus means a reduction in weight, and plus means an increase in weight.

(Change in Weight by Plasma Irradiation)

The filler was put in a laboratory dish made of glass, and was subjected to plasma irradiation under the following conditions to measure a reduction in weight (% by weight) after the irradiation. Thus a change in weight was determined.

Machine used for irradiation of plasma:
(1) In case of oxygen plasma and $CF_4$ plasma
  PX-1000 available from Kabushiki Kaisha Samco International
  Kenkyusho
(2) In case of $NF_3$ plasma
  Etching chamber
Conditions for Irradiation:
  Irradiation of oxygen ($O_2$) plasma
    Gas flow: 200 sccm
    RF output: 400 W
    Pressure: 300 mTorr
    Etching time: 1 hour, 2 hours, 3 hours
    Frequency: 13.56 MHz
  Irradiation of $CF_4$ plasma
    Gas flow: 200 sccm
    RF output: 400 W
    Pressure: 300 mTorr
    Etching time: 1 hour, 2 hours, 3 hours
    Frequency: 13.56 MHz
  Irradiation of $NF_3$ plasma
    Gas flow: 51 sccm
    RF output: 600 W
    Pressure: 100 mTorr
    Etching time: 0.5 hour
    Frequency: 13.56 MHz
Irradiation Step:

In order to stabilize an atmosphere in a chamber of plasma irradiation machine, actual gas discharging is carried out for 5 minutes for pre-treatment of the chamber without using a sample. Then a demonstration dish with the sample is arranged at a center between the RF electrodes and the irradiation is carried out under the above-mentioned conditions.

Measurement of Weight:

A weight of the sample is measured up to the place of 0.0 1 mg and then rounded to one decimal by using an electronic balance 2006MPE available from Sartorius GMBH.

A change in weight of the fine particles of aluminum oxide (Filler 2, Filler 3, Filler 4 and Filler 5) which were used in Example 2 and Comparative Examples 1 to 3 is also shown in Table 1.

Each of the fillers in Table 1 represents the followings.
Filler 1: Fine particles of aluminum oxide (AKP-G008 available from Sumitomo Chemical Industries, Ltd., specific surface area: 80 m²/g, average particle size: 0.02 μm, crystal form: θ-form, monoclinic system).

Filler 2: Fine particles of aluminum oxide (AKP-G015 available from Sumitomo Chemical Industries, Ltd., specific surface area: 150 m²/g, average particle size: 0.02 μm, crystal form: γ-form, pyramidal quadratic system)

Filler 3: Fine particles of aluminum oxide (Adoma Fine AO-802 available from Kabushiki Kaisha Tatsumori, specific surface area: 6 to 8 m²/g, average particle size: 0.7 μm, crystal form: α-form, trigonal system)

Filler 4: Fine particles of silicon oxide (1-FX available from Kabushiki Kaisha Tatsumori, specific surface area: 29 m²/g, average particle size: 0.38 μm)

Filler 5: Fine particles of titanium oxide (TiO₂ P-25 available from Nippon Aerosil Kabushiki Kaisha, specific surface area: 50 m²/g, average particle size: 0.021 μm)

TABLE 1

| | Change in weight of filler (% by weight) | | | | | | |
|---|---|---|---|---|---|---|---|
| | Oxygen plasma Irradiation time (hour) | | | CF₄ plasma Irradiation time (hour) | | | NF₃ plasma Irradiation time (hour) |
| Sample | 1 | 2 | 3 | 1 | 2 | 3 | 0.5 |
| Filler 1 | −0.04 | −0.05 | −0.06 | 0.42 | 0.53 | 0.61 | 0.62 |
| Filler 2 | −0.05 | −0.10 | −0.12 | 0.58 | 0.68 | 0.79 | 0.95 |
| Filler 3 | −0.03 | −0.07 | −0.09 | 0.26 | 0.35 | 0.46 | 0.44 |
| Filler 4 | −0.08 | −0.11 | −0.11 | −1.97 | −3.12 | −4.67 | −76.7 |
| Filler 5 | −0.04 | −0.06 | −0.08 | −1.51 | −2.55 | −3.82 | −100 |

In Table 1, an increase in weight can be recognized only in case of aluminum oxide subjected to fluorine plasma irradiation (CF₄ plasma and NF₃ plasma). The reason for that can be considered to be because aluminum oxide was transformed to aluminum fluoride (solid) by fluorine plasma irradiation. This indicates a shielding effect of aluminum oxide against fluorine plasma.

Then the elastomer composition was subjected to press-crosslinking (primary crosslinking) at 160° C. for 10 minutes and then crosslinking (secondary crosslinking) in an oven at 180° C. for four hours to give an O-ring (AS-568A-214). Also a vulcanization curve of the composition at 160° C. was determined with JSR Curastometer Model II, and a minimum viscosity (ML), degree of vulcanization (MH), induction time (T10) and optimum vulcanizing time (T90) were obtained. Further handling property of the composition was determined in the manner mentioned below. The results are shown in Table 2.

(Processability)

Easiness of handling in the range of from kneading step to crosslinking step of the crosslinkable elastomer composition, for example, easy winding onto a roll and easy cutting at kneading and flowability of the elastomer at crosslinking is synthetically evaluated with naked eyes.

Evaluation was made with naked eyes under the following criteria.

AA: No defects are found, and processing is carried out smoothly. Also no sticking of a filler on a roll is recognized at all.

A: No defects are found, and processing is carried out smoothly.

B: Almost no defect is found. Time and labor are required somewhat particularly at the kneading step.

C: Much time and labor are required in the steps from the kneading step to the crosslinking step, but processing can be finished somehow.

D: Processing cannot be carried out unless the processing conditions are made strict considerably.

Mechanical properties of the O-ring were measured as follows. The results are shown in Table 2.

(Mechanical Properties)

Physical properties in normal state and compression set (200° C., 70 hours, compression by 25%) were measured according to JIS K 6301.

EXAMPLE 2

A crosslinkable elastomer composition was prepared in the same manner as in Example 1 except that fine particles of aluminum oxide (AKP-G015 available from Sumitomo Chemical Industries, Ltd., specific surface area: 150 m²/g, average particle size: 0.02 μm, crystal form: γ-form, Filler 2) were used, and then was molded into O-ring in the same manner as in Example 1. Various characteristics of those composition and molded article were determined in the same manner as in Example 1. The results are shown in Table 2.

COMPARATIVE EXAMPLE 1

A crosslinkable elastomer composition was prepared in the same manner as in Example 1 except that fine particles of aluminum oxide (Adoma Fine AO-802 available from Kabushiki Kaisha Tatsumori, specific surface area: 6 to 8 m²/g, average particle size: 0.7 μm, crystal form: α-form, Filler 3) having a relatively large average particle size were blended instead of the fine particles of aluminum oxide of Example 1. Further the composition was formed into an O-ring in the same manner as in Example 1. Various characteristics of those composition and molded article were determined in the same manner as in Example 1. The results are shown in Table 2.

COMPARATIVE EXAMPLE 2

A crosslinkable elastomer composition was prepared in the same manner as in Example 1 except that fine particles of silicon oxide (1-FX available from Kabushiki Kaisha Tatsumori, specific surface area: 29 m²/g, average particle size: 0.38 μm) shown as Filler 4 in Table 2 were blended in an amount shown in the same Table instead of the fine particles of aluminum oxide. Further the composition was formed into an O-ring in the same manner as in Example 1. Various characteristics of those composition and molded article were determined in the same manner as in Example 1. The results are shown in Table 2.

COMPARATIVE EXAMPLE 3

A crosslinkable elastomer composition was prepared in the same manner as in Example 1 except that fine particles of titanium oxide (TiO₂ P-25 available from Nippon Aerosil Kabushiki Kaisha, specific surface area: 50 m²/g, average particle size: 0.021 μm) shown as Filler 5 in Table 2 were blended in an amount shown in the same Table instead of the fine particles of aluminum oxide. Further the composition was formed into an O-ring in the same manner as in Example 1. Various characteristics of those composition and molded article were determined in the same manner as in Example 1. The results are shown in Table 2.

TABLE 2

|  | Ex. 1 | Ex. 2 | Com. Ex. 1 | Com. Ex. 2 | Com. Ex. 3 |
| --- | --- | --- | --- | --- | --- |
| Components (part by weight) | | | | | |
| Crosslinkable elastomer | 100 | 100 | 100 | 100 | 100 |
| Crosslinking agent | 3 | 3 | 3 | 3 | 3 |
| Crosslinking aid | 1 | 1 | 1 | 1 | 1 |
| Filler | 10 (Filler 1) | 10 (Filler 2) | 10 (Filler 3) | 10 (Filler 4) | 10 (Filler 5) |
| Processability | AA | A | B | B | B |
| Vulcanization characteristics | | | | | |
| ML (kg · f) | 0.66 | 0.22 | 0.12 | 0.11 | 0.15 |
| MH (kg · f) | 6.50 | 5.72 | 6.30 | 5.81 | 5.37 |
| T10 (min) | 0.6 | 0.6 | 0.5 | 0.7 | 0.6 |
| T90 (min) | 1.0 | 1.0 | 1.2 | 1.2 | 1.0 |
| Physical properties in normal state | | | | | |
| M100 (kg · f) | 57 | 81 | 63 | 79 | 60 |
| Tensile strength (kg · f) | 250 | 200 | 184 | 170 | 201 |
| Elongation (%) | 165 | 143 | 160 | 155 | 153 |
| Hardness (JIS A) | 63 | 62 | 59 | 65 | 59 |
| Compression set | 20 | 20 | 12 | 12 | 20 |

EXAMPLES 3 to 4 and COMPARATIVE EXAMPLES 4 to 6

(Plasma Resistance: Change in Weight)

Each of O-rings (AS-568A-214) produced in Examples 1 to 2 and Comparative Examples 1 to 3 was cleaned with sufficient amount of $H_2SO_4/H_2O_2$ (6/4 in weight ratio) at 100° C. for 15 minutes with stirring, with 5% HF at 25° C. for 15 minutes and then with boiling ultra pure water at 100° C. for two hours, followed by heating at 200° C. for 24 hours in a nitrogen gas stream to give a sample.

The sample was subjected to plasma irradiation under the following conditions. A reduction in weight (% by weight) after the irradiation was measured to determine a change in weight. The results are shown in Table 3.

Machine used for Irradiation of Plasma:
(1) In case of oxygen plasma and $CF_4$ plasma
    PX-1000 available from Kabushiki Kaisha Samco International
    Kenkyusho
(2) In case of $NF_3$ plasma
    Etching chamber Conditions for Irradiation:
    Irradiation of oxygen ($O_2$) plasma
        Gas flow: 200 sccm
        RF output: 400 W
        Pressure: 300 mTorr
        Etching time: 1 hour, 2 hours, 3 hours
        Frequency: 13.56 MHz
    Irradiation of $CF_4$ plasma
        Gas flow: 200 sccm
        RF output: 400 W
        Pressure: 300 mTorr
        Etching time: 1 hour, 2 hours, 3 hours
        Frequency: 13.56 MHz
    Irradiation of $NF_3$ plasma
        Gas flow: 51 sccm
        RF output: 600 W
        Pressure: 100 mTorr
        Etching time: 0.5 hour
        Frequency: 13.56 MHz Irradiation Step:
In order to stabilize an atmosphere in a chamber of plasma irradiation machine, actual gas discharging is carried out for 5 minutes for pre-treatment of the chamber without using a sample. Then the sample is arranged at a center between the RF electrodes and the irradiation is carried out under the above-mentioned conditions.

Measurement of Weight:
A weight of the sample is measured up to the place of 0.01 mg and then rounded to one decimal by using an electronic balance 2006MPE available from Sartorius GMBH.

Three samples were used for one kind of composition and an average thereof was used for evaluation.

TABLE 3

| | Change in weight of O-ring (% of weight) | | | | | | |
| --- | --- | --- | --- | --- | --- | --- | --- |
| | Oxygen plasma Irradiation time (hour) | | | $CF_4$ plasma Irradiation time (hour) | | | $NF_3$ plasma Irradiation time (hour) |
| Sample | 1 | 2 | 3 | 1 | 2 | 3 | 0.5 |
| Ex. 3 | −0.15 | −0.21 | −0.28 | −0.09 | −0.16 | −0.20 | −0.22 |
| Ex. 4 | −0.16 | −0.26 | −0.31 | −0.09 | −0.15 | −0.20 | −0.22 |
| Com. Ex. 4 | −0.17 | −0.23 | −0.30 | −0.08 | −0.17 | −0.20 | −0.23 |
| Com. Ex. 5 | −0.17 | −0.26 | −0.34 | −0.17 | −0.29 | −0.38 | −1.09 |
| Com. Ex. 6 | −0.17 | −0.25 | −0.35 | −0.12 | −0.25 | −0.32 | −0.82 |

EXAMPLES 5 to 6 and COMPARATIVE EXAMPLES 7 to 9

(Plasma Resistance: Number of Generated Micro Particles)

With respect to the O-rings (AS-568A-214) cleaned in the same manner as in Examples 3 to 4 and Comparative Examples 4 to 6, plasma resistance thereof (number of generated micro particles) was determined by the following method. The results are shown in Table 4.

(Plasma Resistance Test: Number of Micro Particles Generated)

With respect to oxygen plasma resistance test and $CF_4$ plasma resistance test, oxygen plasma or $CF_4$ plasma was generated under the conditions of a vacuum pressure of 50 mTorr, an oxygen flow or $CF_4$ flow of 200 sccm, electric power of 400 W and a frequency of 13.56 MHz by using Plasma Dry Cleaner Model PX-1000 available from Kabushiki Kaisha Samco International Kenkyusho, and the generated oxygen plasma or $CF_4$ plasma was irradiated to the samples (O-ring) under the reactive ion etching (RIE) conditions for three hours. With respect to $NF_3$ plasma resistance test, $NF_3$ plasma was generated under the conditions of a vacuum pressure of 100 mTorr, a $NF_3$ flow of 51 sccm, electric power of 600 W and a frequency of 13.56 MHz by using Etching Chamber, and the generated plasma was irradiated under the reactive ion etching (RIE) conditions for 0.5 hour against the sample (O-ring). After the irradiation, a supersonic wave was applied to the samples in ultra pure water at 25° C. for one hour to take out free micro particles in water, and then the number of micro particles (per liter) having a particle size of not less than 0.2 μm was measured by a fine particle meter method (a method of emitting light to ultra pure water containing micro particles which was flowed into a sensor part and then electrically measuring amounts of transmitted light and scattered light with a submerged micro particle counter). In Table 4, values converted to the number of micro particles per one O-ring are shown.

Irradiation of $NF_3$ plasma
   Gas flow: 16 sccm
   RF output: 800 W
   Pressure: 10 mTorr
   Etching time: 30 minutes
   Frequency: 13.56 MHz
Irradiation step:
   as in Example 3.

TABLE 5

| | | Change in weight of O-ring (Irradiation time: 30 min, % by weight) | | |
|---|---|---|---|---|
| Sample | Filler | Oxygen plasma | $CF_4$ plasma | $NF_3$ plasma |
| Ex. 7 | Filler 1 | 0.90 | 0.98 | 1.63 |
| Ex. 8 | Filler 2 | 0.92 | 1.08 | 1.65 |
| Com. Ex. 10 | Filler 3 | 0.94 | 1.12 | 1.68 |
| Com. Ex. 11 | Filler 4 | 1.39 | 3.68 | 5.82 |
| Com. Ex. 12 | Filler 5 | 1.28 | 3.78 | 6.31 |

TABLE 4

| | Number of particles (× $10^4$/O-ring) | | | |
|---|---|---|---|---|
| Sample | Before irradiation | After 3-hour irradiation of oxygen plasma | After 3-hour irradiation of $CF_4$ plasma | After 0.5-hour irradiation of $NF_3$ plasma |
| Ex. 5 | 7.23 | 14.62 | 14.81 | 38.21 |
| Ex. 6 | 7.89 | 14.71 | 15.01 | 39.01 |
| Com. Ex. 7 | 8.21 | 74.70 | 74.23 | 79.82 |
| Com. Ex. 8 | 6.98 | 21.23 | 17.32 | 41.30 |
| Com. Ex. 9 | 6.92 | 83.20 | 18.40 | 42.15 |

EXAMPLES 7 to 8 and COMPARATIVE EXAMPLES 10 to 12

The O-rings (AS-568A-214) cleaned in the same manner as in Examples 3 to 4 and Comparative Examples 4 to 6 were subjected to high density plasma irradiation under the following conditions. A weight reduction (% by weight) after the irradiation was measured to determine a change in weight (Table 5), and plasma resistance thereof (number of generated micro particles) was determined by the same method as in Example 5 (Table 6).

Machine used for Irradiation of Plasma:
   ICP high density plasma irradiation machine Model RIE-10JJPH available from Kabushiki Kaisha Samco International Kenkyusho Conditions for irradiation:
      Plasma density with argon gas plasma at 10 mTorr at an output of 800 W is $6.00 \times 10^{11}$ (cm$^{-3}$).
   Irradiation of oxygen ($O_2$) plasma
      Gas flow: 16 sccm
      RF output: 800 W
      Pressure: 10 mTorr
      Etching time: 30 minutes
      Frequency: 13.56 MHz
   Irradiation of $CF_4$ plasma
      Gas flow: 16 sccm
      RF output: 800 W
      Pressure: 10 mTorr
      Etching time: 30 minutes
      Frequency: 13.56 MHz

TABLE 6

| | Number of micro particles after 30-min irradiation (× $10^4$/O-ring) | | | |
|---|---|---|---|---|
| Sample | Before irradiation | Oxygen plasma | $CF_4$ plasma | $NF_3$ plasma |
| Ex. 7 | 7.23 | 12.84 | 23.53 | 23.72 |
| Ex. 8 | 7.89 | 13.81 | 25.12 | 24.23 |
| Com. Ex. 10 | 8.21 | 78.71 | 78.69 | 81.23 |
| Com. Ex. 11 | 6.98 | 23.82 | 25.81 | 24.89 |
| Com. Ex. 12 | 6.92 | 92.18 | 32.28 | 28.48 |

From the results of Examples 1 to 8 and Comparative Examples 1 to 12, it can be said that there are the following facts.

First from the results of Table 1 (change in weight of a filler in plasma treatment), it can be seen that in cases of Filler 4 of silicon oxide and Filler 5 of titanium oxide other than aluminum oxide, a shielding effect against fluorine plasma is not obtained.

From the results of Table 2 (processability, vulcanizability and physical properties of molded article), it can be seen that in cases of Fillers 3 to 5 other than the aluminum oxide Fillers 1 and 2 used in the present invention, processability is not good, and further in case of the aluminum oxide filler (Filler 3) having an average particle size exceeding 0.5 μm, a mechanical strength (tensile strength and hardness) of the obtained elastomer molded article is inferior.

Also while it is known that in a process for heat-treating hydrated alumina, various forms of aluminum oxides are generated, particularly θ-form (monoclinic system) is excellent in processability.

From the results of Table 3 (change in weight of elastomer molded article), it can be seen that in cases of the silicon oxide Filler 4 and titanium oxide Filler 5 other than aluminum oxide, a resistance to fluorine plasma is inferior even in elastomer molded article as presumed by the results of Table 1.

From Table 4 (number of micro particles generated in plasma process), it can be seen that in case of Filler 3 having a relatively large particle size, micro particles, generation of which must be avoided in the plasma process, are generated in great numbers and therefore the obtained elastomer molded article cannot be used for micro-fabrication in production of semi-conductors.

From Table 5 (weight reduction and the number of generated micro particles of elastomer molded article in high density plasma treatment), it can be seen that in case of higher density plasma process, a shielding effect of aluminum oxide filler is effectively exhibited even in oxygen plasma treatment, and with respect to the number of generated micro particles, the same tendency as in Table 4 can be recognized.

From the above-mentioned facts, it can be seen that in the present invention where fine particles of aluminum oxide having an average particle size of not more than 0.5 μm, especially not more than 0.05 μm are used, the elastomer composition is excellent in processability and vulcanizability, a weight reduction of the elastomer molded article is small even under high density plasma environment, and the number of generated micro particles is very few.

As mentioned above, the molded article of the present invention has physical properties suitable for a very strict production environment required in the field of production of semi-conductors.

INDUSTRIAL APPLICABILITY

The crosslinkable elastomer composition of the present invention which comprises the fine powders of aluminum oxide is excellent in plasma resistance, and the number of micro particles generated after plasma irradiation is very small and thus the composition is suitable as a very clean elastomer material for molded article for semiconductor production apparatuses.

What is claimed is:

1. An elastomer molded article for semi-conductor production apparatuses obtained by crosslinking and molding a crosslinkable fluorine-containing elastomer composition comprising a crosslinkable fluorine-containing elastomer component and fine particles of aluminum oxide; said fine particles of aluminum oxide having an average particle size or not more than 0.5 μm.

2. The molded article of claim 1, wherein an average particle size of the fine particles of aluminum oxide is from 0.005 to 0.05 μm.

3. The molded article of claim 1 which is a sealing material to be used for sealing of semiconductor production apparatuses.

4. The molded article of claim 3 which is a sealing material to be used for sealing of semiconductor production apparatuses in which irradiation of high density plasma is carried out.

5. The molded article of claim 1, wherein the crosslinkable fluorine-containing elastomer composition comprises 0.05 to 10 part by weight of an organic peroxide, 0.1 to 10 parts by weight of a crosslinking aid and 1 to 150 parts by weight of said fine particles of aluminum oxide on the basis of 100 parts by weight of the crosslinkable fluorine-containing eleastomer component.

6. The molded article of claim 1, wherein the crosslinkable fluorine-containing elastomer is a perfluoro elastomer.

7. Semiconductor production apparatuses provided with the elastomer molded article for semiconductor production apparatuses of claim 1.

8. A crosslinkable fluorine-containing elastomer composition which comprises a crosslinkable fluorine-containing elastomer component and fine particles of aluminum oxide having an average particle size or not more than 0.5 μm and is used for producing an elastomer molded article for semiconductor production apparatuses.

* * * * *